March 29, 1938.  T. J. ARBRON  2,112,324
EGG GRADER
Filed May 8, 1935  2 Sheets-Sheet 1

INVENTOR.
Thomas J. Arbron.
BY
ATTORNEY

March 29, 1938. T. J. ARBRON 2,112,324
EGG GRADER
Filed May 8, 1935 2 Sheets-Sheet 2
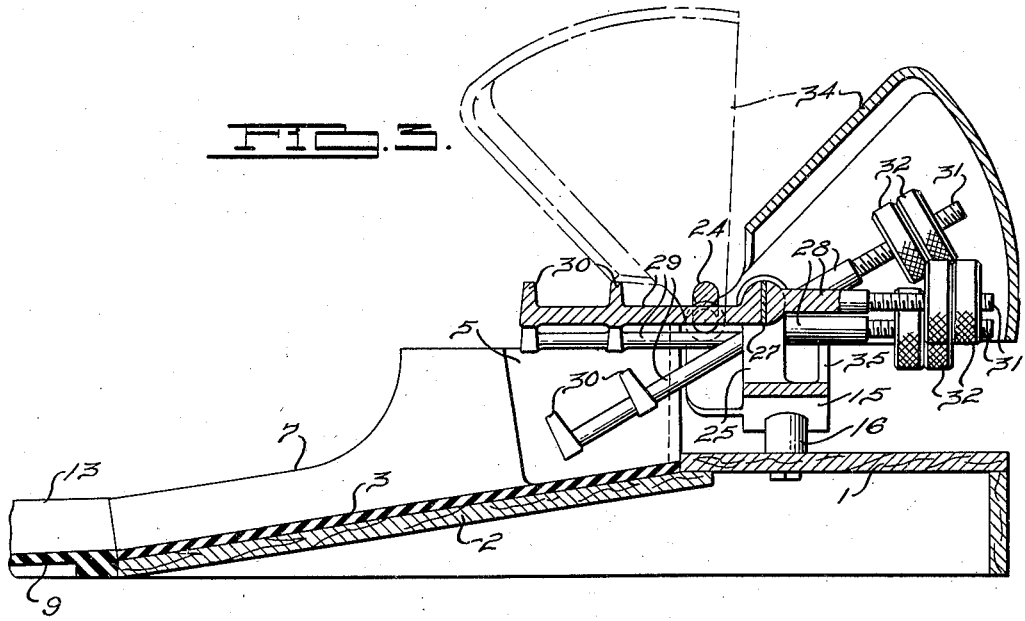
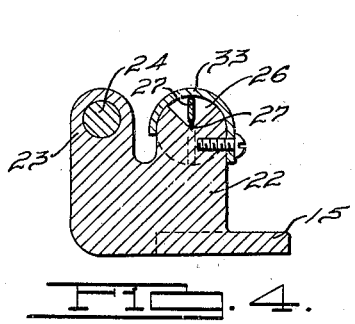
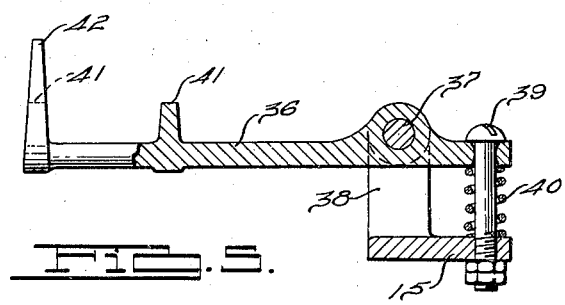
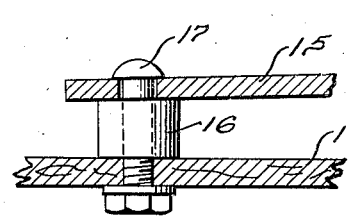
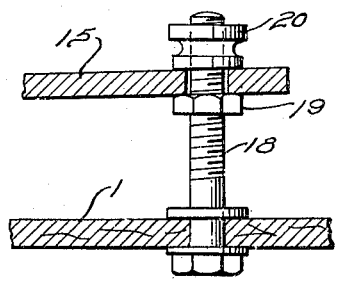
INVENTOR.
Thomas J. Arbron.
BY
ATTORNEY Patented Mar. 29, 1938

2,112,324

UNITED STATES PATENT OFFICE 2,112,324

EGG GRADER

Thomas J. Arbron, Royal Oak, Mich.

Application May 8, 1935, Serial No. 20,341

1 Claim. (Cl. 209—121)

This invention relates to egg graders and the object of the invention is to provide a device by which eggs may be graded as to weight and delivered into different compartments according to their weights.

A further object of the invention is to provide an egg grader including a runway down which the eggs may roll and formed of sections which may be depressed when the proper weight egg rests thereon.

Another object of the invention is to provide an egg grader having a series of pivoted sections arranged to tip on their pivots when the proper weight egg rests thereon, the tipping of a section on its pivot delivering the egg into a compartment for that egg.

A further object of the invention is to provide an egg grader formed of a series of sections each having an adjustable weight whereby the weight necessary to turn a certain section on its pivot may be varied.

A further object of the invention is to provide a frame member for the runway which may be adjusted in position to cause the desired roll of the eggs positioned on the runway.

Another object of the invention is to provide an egg grader in which the runway sections are pivoted on knife edges so as to allow free action of the sections in the pivotal movement.

These objects and the several novel features of the invention are hereinafter more fully described and claimed and the preferred form of construction by which these objects are attained is shown in the accompanying drawings in which—

Fig. 3 is an enlarged section taken on line 3—3 of Fig. 2.

Fig. 4 is an enlarged section taken on line 4—4 of Fig. 2.

Fig. 5 is an enlarged section taken on line 5—5 of Fig. 2.

Fig. 6 is an enlarged section taken on line 6—6 of Fig. 2.

Fig. 7 is an enlarged section taken on line 7—7 of Fig. 2.

Figure 1:
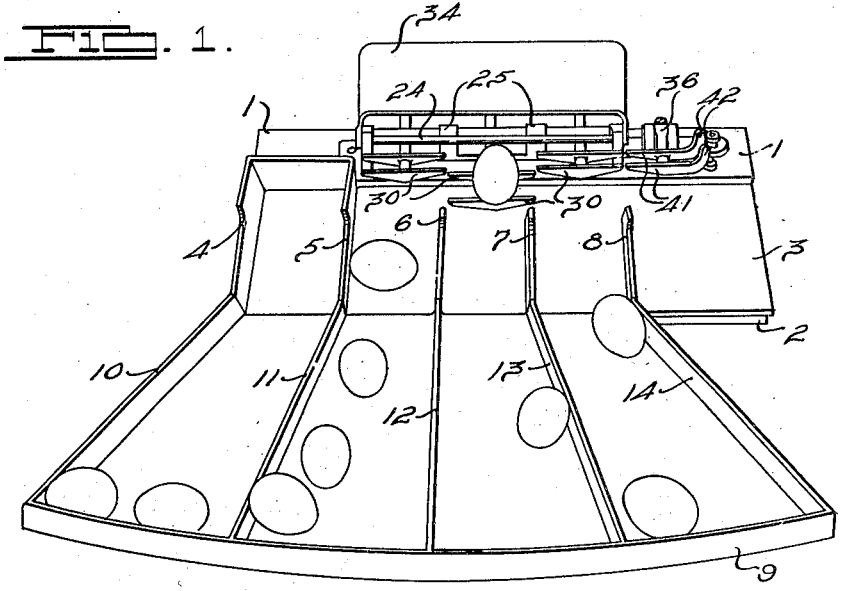
Fig. 1 is a perspective view of an egg grader embodying my invention.
Figure 2:
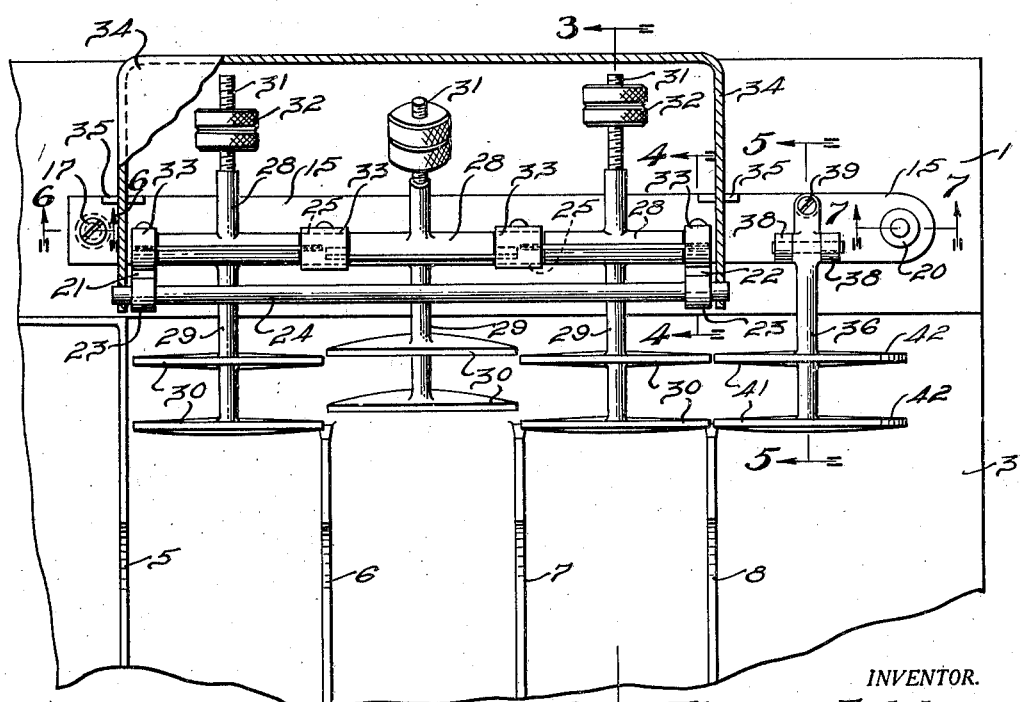
Fig. 2 is a plan view of the grading mechanism with the cover broken away to show the construction.

The device comprises a base 1 shown in Figs. 1, 2 and 3 having an angular portion 2 on which a compartment tray 3 may be positioned. The tray 3 is preferably formed of a soft rubber so that the eggs dropping into the tray will not tend to break easily and this tray is provided with partitions 4, 5, 6, 7, and 8, as shown in Figs. 1 and 2. A large segmental tray 9 is positioned against the lower edge of the tray 3 and is provided with partitions 10, 11, 12, 13 and 14 which align with the partitions in the tray 3, as shown in Fig. 1. As shown more particularly in Figs. 2 and 3, a metal frame member 15 is provided which is supported at one end on a spacer 16 through which the bolt 17 extends into the base, as shown in Fig. 6, and at the opposite end the member 15 is supported on a bolt 18 which is secured in the base 1, as shown in Fig. 7.

This end of the frame member 15 is supported in the nuts 19 and 20 on the bolt 18 and by raising or lowering these nuts the frame may be raised or lowered at this end. Formed integrally with the frame member 15 is a pair of brackets 21 and 22 shown more particularly in Figs. 2 and 4. These brackets are each provided with a portion 23 in which a limit rod is mounted and a pair of brackets 25 are formed integrally with the portion 15 between the brackets 21 and 22 as shown more particularly in Figs. 2 and 3. Each of the brackets is provided with a V-shaped notch 26 at the top as shown in Fig. 4 and the knife edges 27 of the pivot blades rest in the bottom of these notches. A member 28 is secured to one side of each pivot blade while a member 29 is secured to the opposite side thereof and is provided with rib portions 30 forming a runway portion for the eggs. Each member 28 is provided with a threaded extension 31 onto which a weight 32 is threaded and these weights may be adjusted in position to vary the weight required to tip the respective runway portion. The members 29 normally engage against the limit bar 24 as will be understood from Figs. 2 and 3 so that the runway portions 30 normally extend in alignment. A cap 33 is provided over the top of each bracket as shown in Figs. 2 and 4 to prevent foreign matter from falling into the V-shaped notches 26. A cover 34 is provided for the mechanism, as shown in Figs. 1, 2, and 3, and this cover is pivoted on the ends of the limit rod 24 and rests on lugs 35 extending upwardly from the frame member 15, as shown in Figs. 2 and 3.

Outside of the cover 34, a runway member 36 is provided as shown in Figs. 2 and 5 and this member is pivotally mounted on a pivot 37 in a bracket 38 which extends upwardly from the frame member 15. A screw 39 extends through the end of the member 36 and through the member 15 and a spring 40 is provided between the member 15 and the member 36. By this arrangement, the screw 39 may be turned to adjust the position of the ribs 41 on the member 36 to bring them to alignment with the ribs 30 on the remaining runway portions. The ribs 41 are provided with upturned portions 42 at the ends as shown more particularly in Figs. 1 and 5.

In use in grading eggs, each egg is positioned on the ribs 41 and is allowed to roll over the ribs 30 of the various runway portions, as will be understood more particularly in Fig. 1. The weights 32 on the members 29 may be adjusted to different degrees. For instance, the weight for the first runway portion over which the egg rolls may be adjusted so that it requires a two ounce egg to tip the runway portion so that the eggs falling into the compartment between the partitions 7 and 8 will weigh twenty-four ounces to the dozen. The next weight may be adjusted so that the eggs in the next compartment between the partitions 6 and 7 will weigh twenty-two ounces to the dozen and the weight on the next tilting member may be adjusted so that the eggs falling between the partitions 5 and 6 will weigh twenty ounces to the dozen, while the eggs rolling over into the compartment between the partitions 4 and 5 will weigh less than twenty ounces to the dozen.

By this arrangement the eggs are positioned on the ribs 41 and are allowed to roll down the runway and as each section of the runway is individually supported the portion of the runway which the egg will tip will allow the egg to be discharged into the proper compartment and the poorer eggs which will not tip any of the runway sections will pass over into the last compartment between the partitions 4 and 5. The tray 9 provides a continuation of the compartments so that the eggs will accumulate in the proper compartments. In order to adjust the weights the cover 34 is turnable on the limit rod 24 to the dotted position shown in Fig. 4 which will allow for manual adjustment of the weights or access to various parts of the mechanism. By regulating the nuts 19 and 20, shown in Fig. 7, the angle of the frame member 15 may be varied to vary the angle of the runway so that the eggs may be caused to roll faster or slower down the runway as desired.

From the foregoing description it becomes evident that the device is very simple and efficient in operation, will not easily get out of order, may be adjusted to vary the grading weights of the eggs and provides a device which accomplishes the objects described.

Having thus fully described my invention, its utility and mode of operation, what I claim and desire to secure by Letters Patent of the United States is—

In an egg grader, a base, a frame member mounted on the base, a series of brackets extending upwardly from the base and each provided with a V-shaped notch in the top, a series of tilting members positioned between the brackets and each having extending blade portions resting in the notches of the respective brackets, each tilting member being provided with a runway portion on one side of the blade portion and with a threaded extension on the opposite side, a weight threaded onto each threaded extension, a limit rod against which the tilting members are normally turned by the weights, an adjustably fixed runway member at one end of the series of tilting members and having a runway portion aligning with the runway portions of the tilting members, the runway portions extending in alignment at an angle to the horizontal when the tilting members engage the limit rod, each tilting member being turnable on its pivot independently of the other tilting members, a cover member pivotally mounted on the limit rod and a pair of lugs extending upwardly from the frame member on which the cover member normally rests, the cover member being turnable away from the lugs to allow manual adjustment of the weights on the threaded extensions of the tilting members.

THOMAS J. ARBRON.